(12) United States Patent
Sacks et al.

(10) Patent No.: US 6,426,845 B1
(45) Date of Patent: Jul. 30, 2002

(54) ASYNCHRONOUS ANALOG DEMODULATOR AND METHOD FOR A NULL-TYPE SERVO PATTERN

(75) Inventors: Alexei H. Sacks, St. Louis Park; Timothy F. Ellis, Tonka Bay, both of MN (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/268,012

(22) Filed: Mar. 15, 1999

Related U.S. Application Data
(60) Provisional application No. 60/086,276, filed on May 21, 1998, and provisional application No. 60/086,278, filed on May 21, 1998.

(51) Int. Cl.[7] ............................................. G11B 5/596
(52) U.S. Cl. ................... 360/77.08; 360/29; 360/78.14
(58) Field of Search .......................... 360/29, 51, 77.08, 360/77.02, 77.11, 78.04, 78.14

(56) References Cited

U.S. PATENT DOCUMENTS

| | | | |
|---|---|---|---|
| 4,297,734 A | 10/1981 | Laishley et al. | 360/78 |
| 4,511,938 A | 4/1985 | Betts | 360/77 |
| 4,535,372 A | * 8/1985 | Yeakley | 360/77.05 |
| 4,679,103 A | 7/1987 | Workman | 360/77 |
| 4,954,907 A | 9/1990 | Takita | 360/78.07 |
| 5,041,926 A | 8/1991 | Ockerese et al. | 360/77.05 |
| 5,089,757 A | 2/1992 | Wilson | 318/560 |
| 5,117,408 A | 5/1992 | Weispfenning et al. | 369/32 |
| 5,136,439 A | 8/1992 | Weispfenning et al. | 360/77.08 |
| 5,345,342 A | 9/1994 | Abbott et al. | 360/48 |
| 5,576,906 A | 11/1996 | Fisher et al. | 360/77.08 |
| 5,602,692 A | 2/1997 | Freitas et al. | 360/77.08 |
| 5,668,678 A | 9/1997 | Reed et al. | 360/51 |
| 5,717,538 A | 2/1998 | Cheung et al. | 360/77.08 |
| 5,774,298 A | 6/1998 | Cheung et al. | 360/77.08 |
| 5,818,659 A | * 10/1998 | Cheung et al. | 360/77.08 |
| 5,825,579 A | 10/1998 | Cheung et al. | 360/77.08 |
| 5,838,512 A | 11/1998 | Okazaki | 360/31 |
| 5,854,714 A | 12/1998 | Reed et al. | 360/51 |
| 5,867,341 A | 2/1999 | Volz et al. | 360/77.08 |
| 6,034,830 A | 3/2000 | Sasamoto | 360/48 |

FOREIGN PATENT DOCUMENTS

| | | |
|---|---|---|
| EP | 0 262 690 A2 | 4/1988 |
| EP | 0 420 439 A1 | 4/1991 |
| EP | 0 798 704 A1 | 10/1997 |
| EP | 0 828 242 A1 | 3/1998 |
| WO | WO 97 28529 | 8/1997 |

OTHER PUBLICATIONS

Tuttle, G.T. et al., "A 130MB/S PRML Read/Write Channel with Digital–Servo Detection", IEEE International Solid State Circuits Conference, vol. 39, Feb. 1, 1996, pp. 64, 65, 419.

Reed, D.E. et al., "Digital Servo Demodulation in a Digital Read Channel", 8th Annual Magnetic Recording Conference on Magnetic Recording Systems, Sep. 8–10, 1997, pp. 13–16.

Abramovitch, D.Y. "Customizable Coherent Servo Demodulation for Disk Drives", Proceedings of the 1998 American Control Conference, vol. 5, Jun. 24–26, 1998, pp. 3043–3049.

* cited by examiner

*Primary Examiner*—Andrew L. Sniezek
(74) *Attorney, Agent, or Firm*—Theodore M. Magee; Westman, Champlin & Kelly, P.A.

(57) ABSTRACT

An asynchronous demodulator and method is provided which determines a position error of a read head relative to a position on a medium in a storage device. The read head generates a-read signal as the read head passes over a servo area on the medium. The demodulator generates a normal demodulating signal that is asynchronous with the read signal and a quadrature demodulating signal that is ninety degrees out of phase with the normal demodulating signal. The read signal is multiplied by the normal demodulating signal and the quadrature demodulating signal to produce a normal position signal and a quadrature position signal. The demodulator produces a position error magnitude and a position error direction based on the normal position signal and the quadrature position signal.

17 Claims, 6 Drawing Sheets

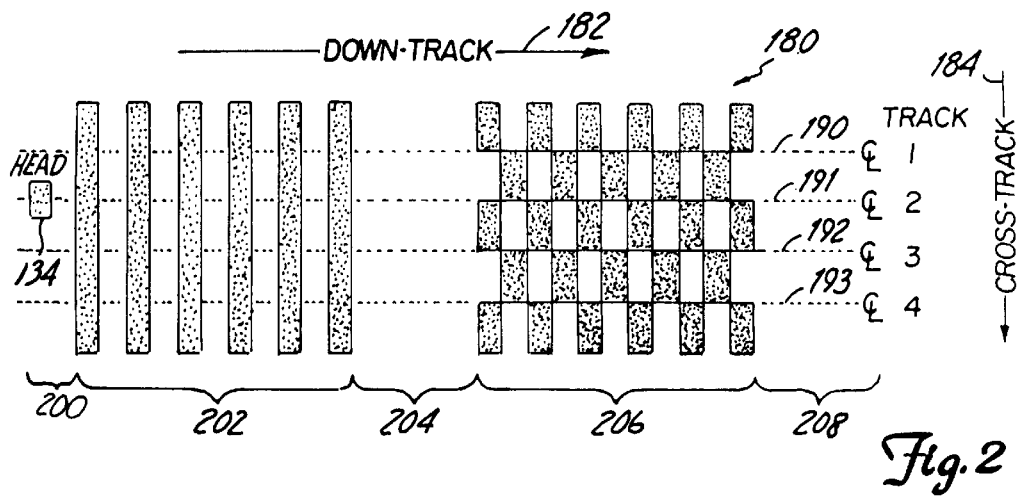
Fig. 2
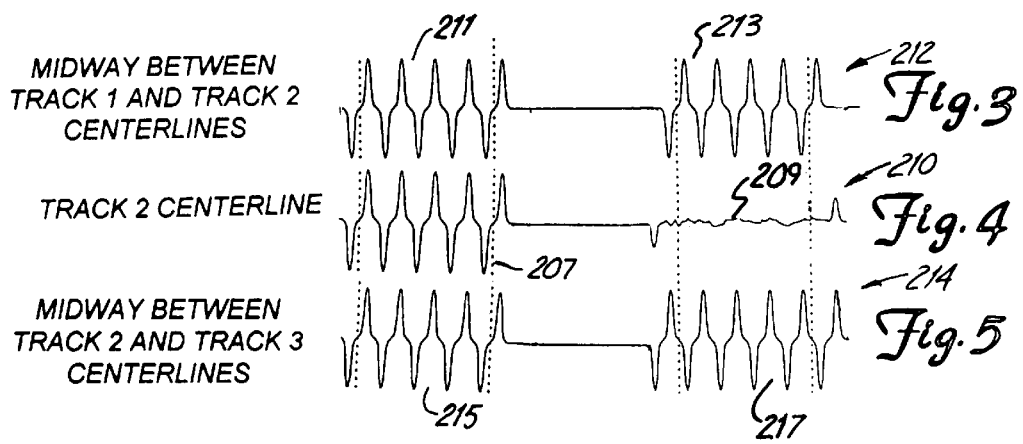
MIDWAY BETWEEN TRACK 1 AND TRACK 2 CENTERLINES — Fig. 3
TRACK 2 CENTERLINE — Fig. 4
MIDWAY BETWEEN TRACK 2 AND TRACK 3 CENTERLINES — Fig. 5
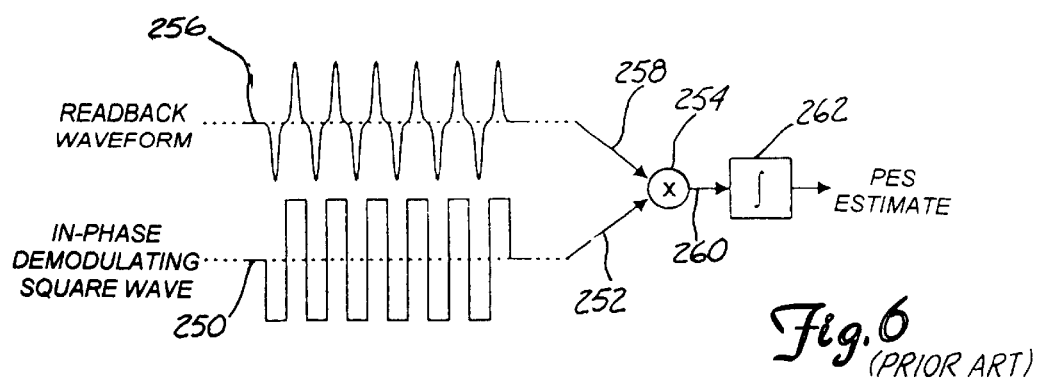
READBACK WAVEFORM
IN-PHASE DEMODULATING SQUARE WAVE
PES ESTIMATE
Fig. 6 (PRIOR ART)

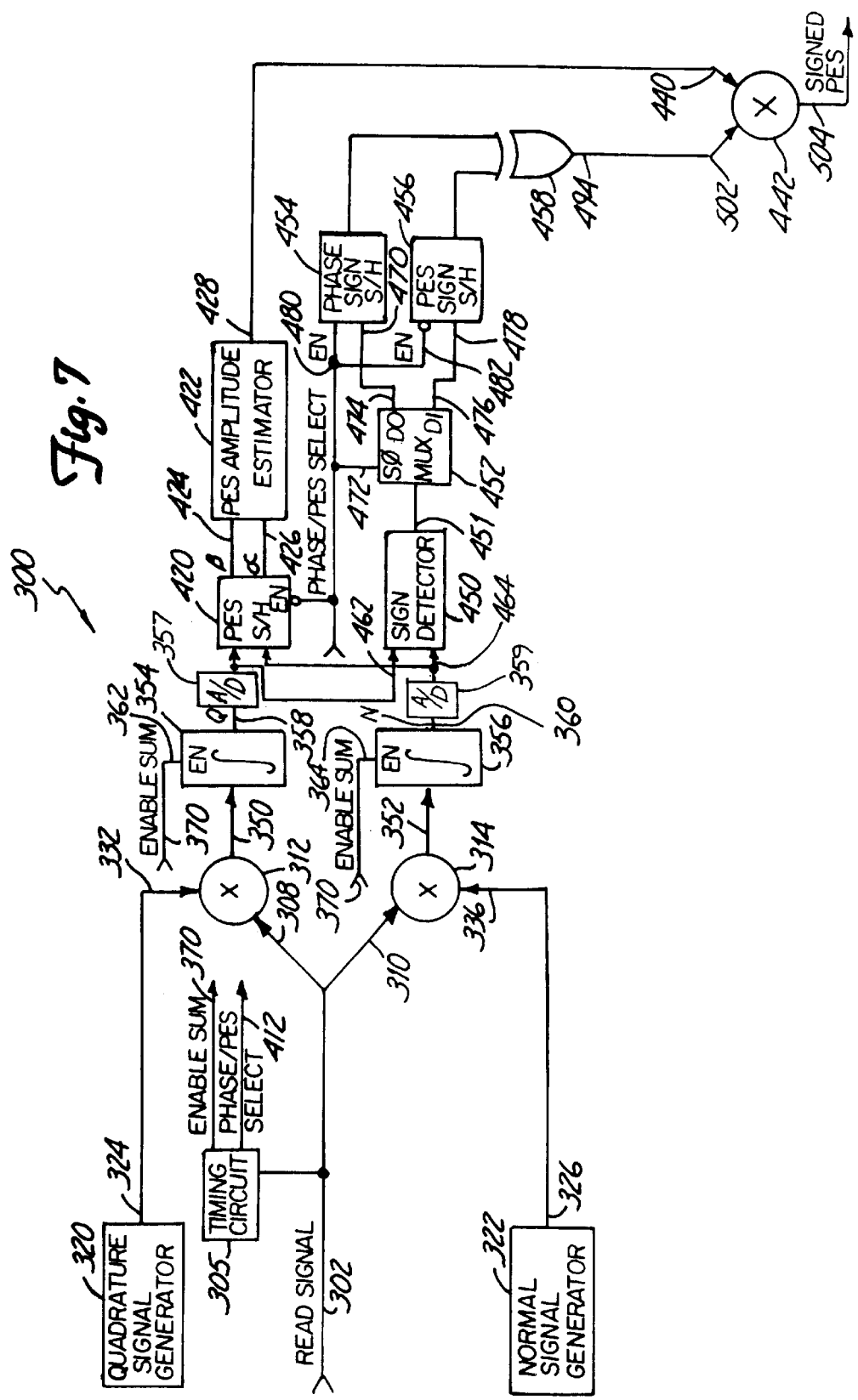

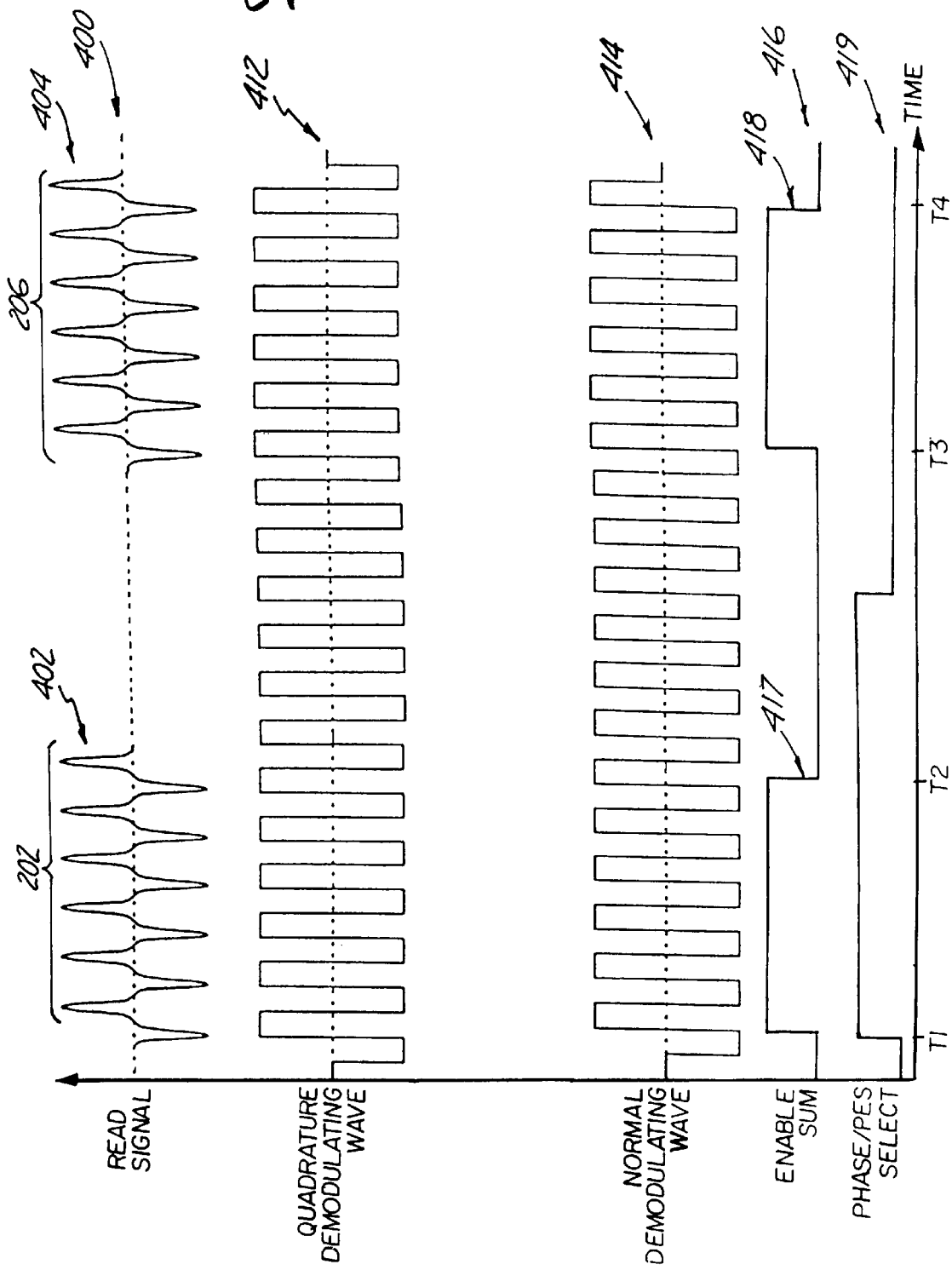

ASYNCHRONOUS ANALOG DEMODULATOR AND METHOD FOR A NULL-TYPE SERVO PATTERN

CROSS-REFERENCE TO RELATED APPLICATION

This application claims the benefit of U.S. Provisional Patent Application No. 60/086,276 entitled "ASYNCHRONOUS ANALOG DEMODULATION TECHNIQUE FOR A NULL TYPE SERVO PATTERN," filed May 21, 1998, and U.S. Provisional Patent Application No. 60/086,278, entitled "FIELD RATIOING DEMODULATION TECHNIQUES FOR A NULL TYPE SERVO PATTERN," filed May 21, 1998.

Cross-reference is also made to three U.S. utility applications filed on even date herewith and assigned to the same assignee as the present application. Specifically, cross-reference is made to: a U.S. utility application entitled "METHOD AND APPARATUS UTILIZING FIELD RATIOING DEMODULATION TECHNIQUES FOR A NULL-TYPE SERVO PATTERN" having attorney docket number "S01.12-0478;" a U.S. utility application entitled "SYNCHRONOUS DIGITAL DEMODULATOR WITH INTEGRATED READ AND SERVO CHANNELS" having attorney docket number "S01.12-0489" and claiming priority from U.S. Provisional Application 60/090,776, filed on Jun. 26, 1998 that is entitled "SYNCHRONOUS DIGITAL DEMODULATION TECHNIQUES FOR A NULL TYPE SERVO PATTERN;" and a U.S. utility application entitled "ASYNCHRONOUS DIGITAL DEMODULATOR AND METHOD FOR A NULL-TYPE SERVO PATTERN;" having attorney docket number "S01.12-0477" and claiming priority from U.S. Provisional Application 60/086,279, filed on May 21, 1998 and entitled "ASYNCHRONOUS DIGITAL DEMODULATION TECHNIQUE FOR A NULL TYPE SERVO PATTERN."

BACKGROUND OF THE INVENTION

The present invention relates to a servo system in a data storage device and, in particular, to the demodulation of position error signals (PES) within the servo system.

A data storage device, such as a magnetic disc drive, stores data on a recording medium. The recording medium is typically divided into a plurality of generally parallel data tracks. In a magnetic disc drive, the data tracks are arranged concentrically with one another, perpendicular to the disc radius. The data is stored and retrieved by a transducer or "head" that is positioned over a desired data track by an actuator arm.

The actuator arm moves the head in a radial direction across the data tracks under the control of a closed-loop servo system based on servo data stored on the disc surface within dedicated servo fields. The servo fields can be interleaved with data sectors on the disc surface or on a separate disc surface that is dedicated to storing servo information. As the head passes over the servo fields, it generates a readback servo signal that identifies the location of the head relative to the centerline of the desired track. Based on this location, the servo system rotates the actuator arm to adjust the head's position so that it moves toward a desired position.

There are several types of servo field patterns, such as a "null type" servo pattern, a "split-burst amplitude" servo pattern, and a "phase type" servo pattern. A null type servo pattern includes at least two fields, which are written at a known phase relation to one another. The first field is a "phase" or "sync" field, which is used to lock the phase and frequency of the read channel to the phase and frequency of the readback signal. The second field is a position error field, which is used to identify the location of the head with respect to the track centerline.

As the head passes over the position error field, the amplitude and phase of the readback signal indicates the magnitude and direction of the head offset with respect to the track centerline. The position error field has a null-type magnetization pattern such that when the head is directly straddling the track centerline, the amplitude of the readback signal is ideally zero. As the head moves away from the desired track centerline, the amplitude of the readback signal increases. When the head is halfway between the desired track centerline and the centerline of the adjacent track, the readback signal has maximum amplitude. The magnetization pattern on one side of the centerline is written 180° out of phase with the magnetization pattern on the other side of the centerline. Thus, the phase of the readback signal indicates the direction of the head position error.

To control the servo system, a single position error value must be determined for each pass over the position error field. Typically, the magnitude of the position error value indicates the distance of the head from the track centerline, and the sign of the position error value indicates the direction of the head's displacement. Demodulating the readback signal associated with the position error field typically creates the position error values.

Demodulation of the readback signal from the null pattern has, in the past, always been a synchronous process. In a synchronous process, the exact phase of the readback signal from the position error field is known from the phase field's readback signal because the phase field is written on the storage medium at a known and fixed phase relation to the position error field. A phase-locked loop (PLL) is typically used to acquire the phase of the phase field, and this phase information is used for demodulating the position error field. The phase field must therefore be sufficiently long to enable the PLL to lock on to the phase and frequency of the readback signal. For example, the phase field may be 3 times longer than the position error field.

In a servo sector scheme, with servo fields interleaved with data fields, long phase fields consume valuable data sectors on the storage medium. These data sectors could otherwise be used for storing data. As disc storage capacity requirements continue to increase, there is a continuing need for reducing the area consumed by servo data.

The present invention addresses these and other problems, and offers other advantages over the prior art.

SUMMARY OF THE INVENTION

The present invention relates to an asynchronous analog demodulator and method, which solve the above-mentioned problems.

One embodiment of the present invention provides a method for determining a position error of a read head relative to a position on a medium in a storage device. The method includes steps of: (a) generating a read signal as the read head passes over a servo area on the medium; (b) generating a normal demodulating signal that is asynchronous with the read signal; (c) generating a quadrate demodulating signal that is ninety degrees out of phase with the normal demodulating signal; (d) multiplying the normal demodulating signal by the read signal to produce a normal position signal (e) multiplying the quadrature demodulating signal by the read signal to produce a quadrature position signal; and (f) producing a position error magnitude and a position error direction based on the normal and quadrature position signals.

Yet another aspect of the present invention provides a method for determining a position error value having a magnitude and a sign indicative of the distance and direction that a read head is displaced relative to a location on a storage medium. The method includes steps of: (a) generating a phase field read signal from a phase field on the medium; (b) generating a position error field read signal from a position error field on the medium; (c) demodulating the position error field read signal using at least one demodulating signal to produce at least one position error field coefficient, the at least one demodulating signal being asynchronous to the position error field read signal; (d) demodulating the phase read signal using at least one demodulating signal to produce at least one phase field coefficient; (e) determining the magnitude of the position error value based at least in part on the at least one position error field coefficient; and (f) determining the sign of the position error value based at least in part on the at least one position error field coefficient and the at least one phase field coefficient.

Another aspect of the present invention provides a disc drive storage device for accessing data on a storage medium. The disc drive includes a read head for generating a read signal. A servo system positions the read head over the medium based in part on a position error value that represents the distance and direction that the read head is displaced from a location on the medium. A normal signal generator generates a normal demodulating signal. A quadrature signal generator generates a quadrature-demodulating signal that is orthogonal to the normal demodulating signal. A normal multiplier multiplies the digital read signal by the normal demodulating signal to produce a normal position signal. A quadrature multiplier multiplies the read signal by the quadrature-demodulating signal to produce quadrature position signal. A magnitude determination circuit determines the magnitude of the position error value based at least in part on the normal position signal and the quadrature position signal. A sign determination circuit determines a sign of the position error value based at least in part on the normal position signal.

Yet another aspect of the present invention provides a disc drive storage device for accessing data on a medium, wherein the device includes a servo structure for positioning a head over the medium based on a position error for the head relative to the medium. The device further includes analog demodulation means for receiving a read signal from the head and generating the position error asynchronously to the read signal.

BRIEF DESCRIPTION OF THE DRAWINGS

FIG. 2 is a diagram showing a null-type servo magnetization pattern used in one embodiment of the present invention and in the prior art.

FIG. 3 is a waveform diagram showing a portion of a readback signal produced by a head passing over a position error field in the pattern shown in FIG. 2 while directly straddling a track centerline.

FIG. 4 is a waveform diagram showing a portion of the readback signal produced while the head is positioned on one side of the desired track centerline.

FIG. 5 is a waveform diagram showing a portion of the readback signal produced while the head is positioned on the other side of the desired track centerline.

FIG. 6 is a diagram illustrating a synchronous analog method according the prior art.

FIG. 7 is a block diagram of an asynchronous digital demodulator circuit according to one embodiment of the present invention.

FIG. 8 is a waveform diagram illustrating various waveforms in the demodulator circuit shown in FIG. 7 over time.

DETAILED DESCRIPTION OF THE PREFERRED EMBODIMENTS

Figure 1:
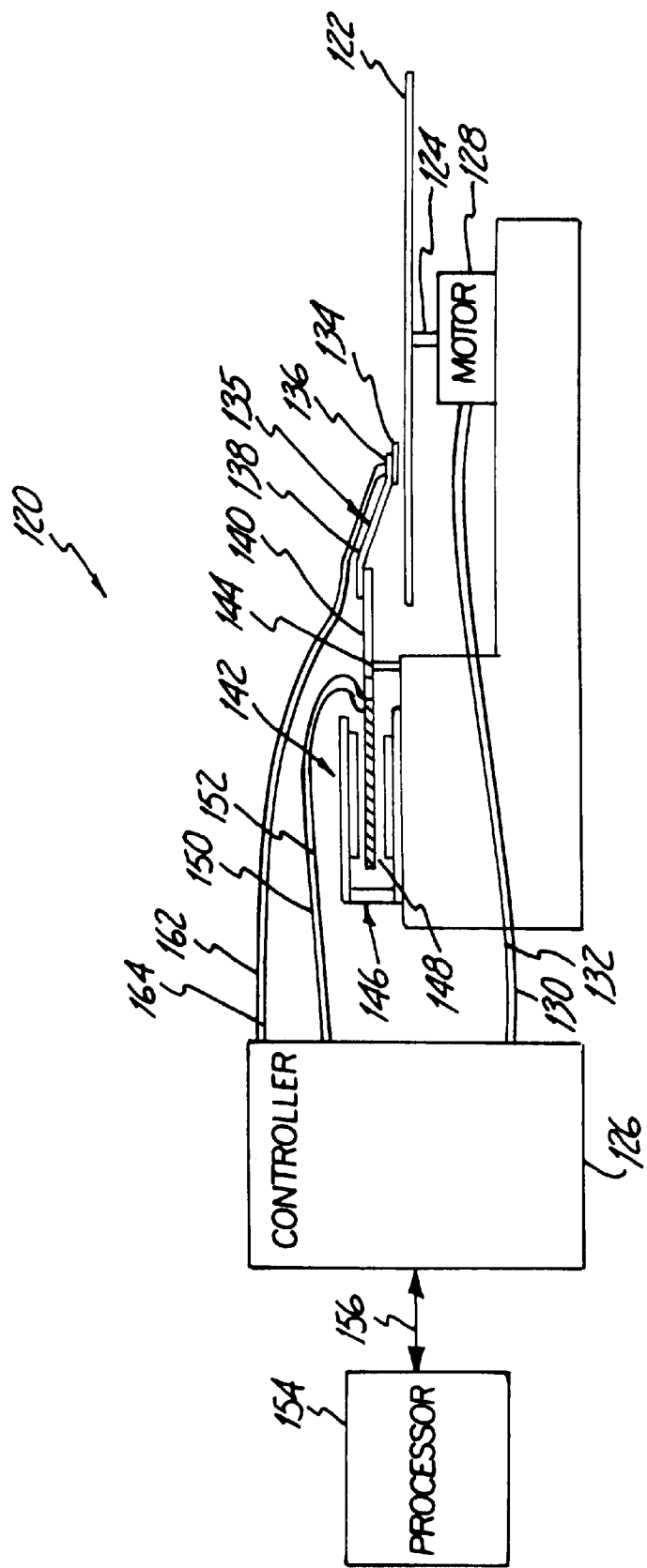
FIG. 1 is a combination block diagram and schematic side view of a data storage system according to one embodiment of the present invention.

FIG. 1 is a combination block diagram and schematic side view of a data storage system 120 according to one embodiment of the present invention. In system 120, a disc 122 rotates about a spindle 124 under the control of controller 126 acting through spindle motor 128. Controller 126 is connected to motor 128 through motor control conductors 130 and 132.

A head 134 is positioned over the surface of disc 122 through a suspension assembly 135 which includes a gimbal 136, a load beam 138, a support arm 140, and an actuator 142. Actuator 142 rotates suspension assembly 135 about pivot point 144, which causes head 134 to move radially in an arc over the surface of disc 122.

Actuator 142 includes magnetic assembly 146 and magnetic coil 148. Magnetic coil 148 is formed on actuator arm 140 on the opposite side of pivot point 144 from load beam 138. Conductors 150 and 152 are connected between magnetic coil 148 and controller 126. Controller 126 passes a current through conductors 150 and 152, which causes magnetic coil 148 to produce a magnetic field that interacts with magnetic fields generated by magnetic assembly 146. This interaction causes actuator arm 140 to rotate about pivot 144 and thereby position head 134 over a desired data track on the surface of disc 122.

During head positioning, processor 154 communicates a desired speed for motor 128 and a desired location for head 134 to controller 126 over bi-directional bus 156. In addition, controller 126 receives readback signals from head 134 through read conductors 162 and 164. In an embedded servo scheme, servo sectors are interleaved with data sectors on the same surface of disc 122. As head 134 passes over a servo sector, the magnetization patterns within the servo sector generate a servo signal in the readback signal. Controller 126 monitors the servo signal to determine the current location of the head. Based on the current location of head 134, and the desired location received from processor 154, controller 126 adjusts the current applied to magnetic coil 148.

FIG. 2 is a diagram showing the essential portions of a null type servo magnetization pattern for a servo section 180 used in one embodiment of the present invention and in the prior art. The radial dimension of disc 122 is shown vertically, and the angular dimension of disc 122 is shown horizontally. Arrow 182 indicates a down-track direction, or angular dimension, of disc 122. Arrow 184 indicates a cross-track direction, or radial dimension, of disc 122. FIG. 2 shows four track centers 190, 191, 192 and 193, which are labeled "1", "2", "3" and "4", respectively. Head 134 is aligned with track center "2" along cross-track direction 184.

The shaded regions in FIG. 2 correspond to regions of opposite magnetic polarity as compared to the non-shaded regions. For example, in a longitudinal recording system, if the longitudinal magnetization in the non-shaded regions were right-to-left in the figure, then the longitudinal magnetization in the shaded regions would be left-to-right. Within these regions, the magnetic medium is saturated in either longitudinal direction, as is standard practice in digital magnetic recording.

Servo sector 180 includes leading fields 200, "sync" or "phase" field 202, middle fields 204, position error field 206 and trailing fields 208. Leading fields 200, middle fields 204 and trailing fields 208 may be "empty" as shown in FIG. 2 or may include additional servo data. For example, middle fields 204 may include a synchronization pattern, a track number, and/or a sector number. Phase field 202 contains radially coherent magnetic transitions. As head 134 passes over phase field 202, the magnetization pattern within phase field 202 induces an oscillating signal in the output of head 134. Position error field 206 contains a null-type magnetic pattern. The null-type magnetic pattern in position error field 206 is written in a predetermined phase relation to the magnetic pattern in phase field 202. Position error field 206 can also include a set of quadrature null patterns (not shown) which are offset by one-half of a track width with respect to the original, normal null burst patterns.

In the prior art, a phase-locked loop is typically used to lock onto the phase and frequency of the oscillating signal induced by phase field 202 and to generate a demodulating or mixing signal having a phase which is synchronized with the phase of the oscillating signal. The rectifying signal is used to demodulate the readback signal from position error field 206. In the prior art, demodulating the readback signal involved multiplying the readback signal by the mixing signal and integrating the result to produce a position error value. Because the null-type servo pattern is written at the same frequency as the phase field and at a fixed phase relation to the phase field, multiplying the two signals produces either a positively rectified signal or a negatively rectified signal. At the track center, the rectified signal will have zero magnitude because the position error signal is zero at the track center. If head 134 is displaced to one side of the track center, the rectified signal is positive, and if head 134 is displaced to the other side of the track center the rectified signal is negative.

Phase field 202 has also been used for automatic gain control (AGC) in order to maintain the amplitude of the readback signal in the same scale range independent of the radial position of head 134. Automatic gain control is essentially used to normalize the demodulated position error to maintain the same slope (gain) in cross-track direction 184.

FIG. 3 is a waveform diagram showing a portion of the readback signal 210 as head 134 passes over phase field 202, middle field 204 and position error field 206 while directly straddling centerline 191 of track 2. Readback signal 210 can be time-wise divided into a phase field signal 207 that is produced when the head passes over phase field 202 and a position error field signal 209 produced when the head passes over position error field 206. Note that because head 134 is straddling a track centerline to produce readback signal 210, the magnitude of position error field signal 209 is substantially zero. FIG. 4 is a waveform diagram showing a portion of a readback signal 212 when head 134 is halfway between centerlines 190 and 191 of tracks 1 and 2, respectively. Readback signal 217 can be divided into phase field signal 211 and position error field signal 213, which are created by head 134 as it passes over phase field 202 and position error field 206, respectively. FIG. 5 is a waveform diagram showing a portion of a readback signal 214 when head 134 is halfway between centerlines 191 and 192 of tracks 2 and 3, respectively. Readback signal 214 can be divided into phase field signal 215 and position error field signal 217. Note that position error field signal 217 in FIG. 5 is 180° out of phase from position error field signal 213 in FIG. 4. It is this phase difference that causes the rectified signal to be positive or negative, depending on which direction head 134 is displaced from the track center.

FIG. 6 is a diagram illustrating a synchronous analog method of demodulating the null magnetization pattern in position error field 206 to generate a position error, according to the prior art. First, a phase-locked loop (not shown) locks on to the phase and frequency of the readback waveform generated by phase field 202 (shown in FIG. 2) and produces a demodulating square wave signal 250 having the same phase and frequency relation with respect to a fundamental component of the readback waveform. Square wave 250 is applied to a first input 252 of a multiplier 254. Next, the readback waveform 256 that is generated by position error field 206 is applied to a second input 258 of multiplier 254. Multiplier 254 multiplies readback waveform 256 with demodulating square wave signal 250 and supplies the result on output 260 to integrator 262.

Integrator 262 integrates the result over a sample integration time window to obtain the position error for that head location. The sample integration time window preferably incorporates the middle cycles of the readback waveform that is generated by position error field 206 because additional cycles outside this window may contribute to errors in the position error value. This is especially important if pulse superposition causes large leading and trailing pulses to occur or if there is magnetic interaction with other fields in servo section 180.

In the example shown in FIG. 6, the position error value at the output of integrator 262 will be positive. If position error field waveform 256 were 180° out of phase from the one shown in FIG. 6, the position error value would be negative. The sign of the position error value indicates which direction head 134 is in relation to the track centerline. The synchronous analog demodulation method rejects signals that are orthogonal to the demodulating square wave 250. These orthogonal types of noise signals can occur when there is some amount of radial incoherence in the pattern. Other sources of orthogonal components are also possible.

The performance of the prior art synchronous system is highly dependent on the accuracy of the phase-locked loop. If the phase of the rectifying signal provided by the phase-locked loop is not aligned with the phase of the phase field, the rectified signal will have both positive and negative components, and the position error value will be inaccurate. To avoid this result, prior art systems have used larger phase fields to ensure proper phase locking.

FIG. 7 is a block diagram of an asynchronous, analog demodulator circuit 300 for a null-type pattern according to one embodiment of the present invention. Demodulator circuit 300 has a read signal input 302, which is coupled to a timing circuit 305 and inputs 308 and 310 of multipliers 312 and 314, respectively.

A quadrature signal generator 320 generates a square-wave quadrature demodulating signal on output 324 that has the same fundamental frequency as the raw read signal received on input 302 from servo sector fields 202 and 206 (shown in FIG. 2). A Normal signal generator 322 generates a square-wave normal demodulating signal on output 326 that also has the same fundamental frequency as the raw read signal received on input 302 but is 90° out of phase with, or orthogonal to, the quadrature demodulating signal on output 324.

In one embodiment, quadrature and normal signal generators 320 and 322 include voltage-controlled oscillators (VCOs) that are set to oscillate at the known frequency at which data is written within servo fields 202 and 206. However, the phases of the normal and quadrature squarewaves are independent of the phase of the read signal As such, demodulator 300 can be referred to as an "asynchronous" demodulator, and the normal and quadrature demodulating signals can be referred to as asynchronous demodulating signals.

Square-wave demodulating signals are fairly simple to implement and provide a high-quality position error signal, as described in more detail below. In alternative embodiments, other demodulation signals can be used such as orthogonal sinusoidal waves (sine and cosine).

Outputs 324 and 326 of signal generators 320 and 322, respectively, are attached to respective inputs 332 and 336 of multipliers 312 and 314. Thus, multipliers 312 and 314 multiply the read signal by the respective demodulating signal received at their respective other inputs. This produces a normal position signal on output 350 of multiplier 314 and a quadrature position signal on output 350 of multiplier 312.

Outputs 350 and 352 of multipliers 312 and 314 are coupled to the inputs of integrators 354 and 356, respectively. Integrators 354 and 356 integrate the position signals on outputs 350 and 352 during selected time windows to obtain a quadrature Fourier coefficient on output 358 and a normal Fourier coefficient on output 360. The quadrature and normal Fourier coefficients are labeled "Q" and "N" on outputs 358 and 360, respectively. Integrators 354 and 356 are enabled during the middle cycles of phase field 202 to integrate a phase portion of the quadrature and normal sample signals and thereby generate a phase field quadrature Fourier coefficient γ on integrator output 358 and a phase field normal Fourier coefficient δ on integrator output 360. Integrators 354 and 356 are later enabled during the middle cycles of position error field 206 to integrate a position error portion of the quadrature and normal position signals and thereby generate a position error field quadrature Fourier coefficient β on integrator output 358 and a position error field normal Fourier coefficient α on integrator output 360. Integrators 354 and 356 have enable inputs 362 and 364 which are coupled to enable sum output 370 of timing circuit 305 for enabling each circuit during the desired time windows.

Timing circuit 305 is coupled to read input 302 and activates enable sum output 370 during the middle cycles of phase field 202 and position error field 206. Enable sum output 370 is activated at a predetermined time following detection of a synchronization or servo address mark ("SAM"), for example, in middle fields 204. Timing circuit 305 also generates a phase/PES select signal on output 412 which is toggled at a predetermined time following phase field 202 and before PES field 206, as discussed in more detail below.

FIG. 8 is a waveform diagram illustrating various waveforms in demodulator circuit 300 over time. Waveform 400 represents the read signal received on read input 302. Read signal 400 includes phase field signal 402 and position error field signal 404 from phase field 202 and position error field 206, respectively.

Waveforms 412 and 414 represent the quadrature and normal demodulating square waves generated on outputs 324 and 326, respectively. These signals are 90° out of phase with one another. Waveform 416 represents the enable sum signal generated on enable output 370 of timing circuit 305. The enable sum signal goes active at time T1 and inactive at time T2 to define a phase field integration time window 417 during which integrators 354 and 356 are enabled to generate the phase field Fourier coefficients. The enable sum signal goes active again at time T3 and inactive at time T4 to define a position error field integrator time window 418 during which integrators 354 and 356 are enabled for generating the position error field Fourier coefficients.

Timing circuit 305 also generates phase/PES select signal 419 on output 412, which is active during phase field 202 and inactive during position error field 206. PES select signal 419 is used in demodulator 300 to route data and control various sample and hold circuits to account for the fact that the servo bursts from phase field 202 and position error field 206 occur at different times.

Integrators 354 and 356 therefore generate two sets of Fourier coefficients on outputs 358 and 360. The phase field Fourier coefficients γ and δ are generated for the data collected between times T1 and T2 in FIG. 8, and the position error field Fourier coefficients β and α are generated for the data collected between times T3 and T4. Once the phase field and position error fields Fourier coefficients are obtained, further signal processing is necessary to obtain a position error amplitude value and a position error direction or sign value from the Fourier coefficients.

Referring back to FIG. 7, analog-to-digital converters 357 and 359 are coupled to integrator outputs 358 and 360, respectively, and convert the analog Fourier coefficients produced by integrators 354 and 356 into digital Fourier coefficients. The digital values produced by analog-to-digital converters 357 and 359 are provided to position error field sample and hold circuit 420, which is enabled when the phase/PES select signal on output 412 is inactive. Circuit 420 serves to sample and then hold the digital position error field Fourier coefficients β and α that are generated by analog-to-digital converters 357 and 359. Position error field sample and hold circuit 420 feeds these coefficients to inputs 424 and 426 of position error amplitude estimator circuit 422. Amplitude estimator 422 generates position error amplitude or magnitude value based on the position error field Fourier coefficients stored in circuit 420. In one embodiment, circuit 422 generates the position error amplitude value using a square root of the sum of the square circuit, as shown in FIG. 9.

Figure 9:
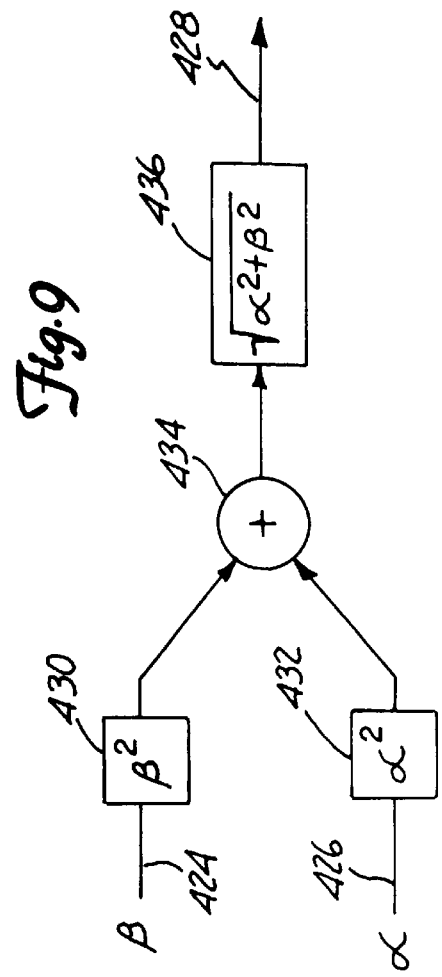
FIG. 9 is a diagram of a square root of the sum of the square circuit.

In the circuit shown in FIG. 9, input 424 receives the quadrature position error field coefficient β, and input 426 receives the normal position error field coefficient α. The quadrature and normal coefficients α and β are squared by squaring circuits 430 and 432, respectively to produce squared quadrature and normal coefficients which are summed by summing circuit 434. The output of summing circuit 434, $\beta^2 + \alpha^2$, is applied to the input of square root circuit 436. Square root circuit 436 generates the position error amplitude value on output 428, which is the square root of $\beta^2 + \alpha^2$. Referring back to FIG. 7, the position error amplitude value generated on output 428 is applied to input 440 of multiplier 442.

The overall sign or direction of the position error is generated by sign detector circuit 450, demultiplexer 452, phase field sign sample and hold circuit 454, position error field sign sample and hold circuit 456, and exclusive-OR (XOR) gate 458. Sign detector circuit 450 has inputs 462 and 464, which are coupled to outputs of analog-to-digital converters 357 and 359, respectively. Sign detector circuit 450 has a sign output 451, which is coupled to the input of demultiplexer 452.

During the time window in which the phase field Fourier coefficients γ and δ are present on the outputs of analog-to-digital converters 357 and 359, sign detector circuit 450 determines the sign of at least one of the coefficients γ and δ and applies a phase field sign value (e.g., a logical "0" or "1") to sign output 451. Since the phase/PES select signal is active, demultiplexer 452 routes the phase field sign value to demultiplexer output 474, which is coupled to data input 470 of phase field sign sample and hold circuit 454. Sample and hold circuit 454 samples and then holds the phase field sign value in response to phase/PES select signal 419 provided at its enable input 480.

During the time window in which the position error field Fourier coefficients α and β are present on the outputs 358 and 360, sign detector circuit 450 determines the sign of at least one of the coefficients α and β and applies a position error field sign value (e.g., a logical "0" or "1") to sign output 451. Since phase/PES select signal 419 is inactive, demultiplexer 452 routes the phase field sign value to demultiplexer output 476, which is coupled to data input 478 of position error field sign sample and hold circuit 456. Sample and hold circuit 456 samples and then holds the position error field sign value in response to phase/PES select signal 419 provided to inverting enable input 482.

Sample and hold circuits 420,454 and 456 can include latches or flip-flops, for example, and can be level-triggered or edge-triggered as desired. Timing circuit 305 can be modified as desired to generate the appropriate edge or level on phase/PES select output 412 during the correct time window as is known in the art.

The outputs of sample and hold circuits 454 and 456 are coupled to the inputs of XOR gate 458, which compares the relative sign values of the coefficients. The following table provides a truth table for XOR gate 458 showing both the binary values (0 or 1) and the corresponding signs of the coefficients and the binary value and overall sign for the position error value.

| PHASE FIELD SIGN | PES FIELD SIGN | OVERALL SIGN |
| --- | --- | --- |
| 0, NEG | 0, NEG | 0, NEG |
| 0, NEG | 1, POS | 1, POS |
| 1, POS | 0, NEG | 1, POS |
| 1, POS | 1, POS | 0, NEG |

The result of XOR gate 458 on output 494 represents the overall sign or direction of the head position error.

Output 494 of XOR gate 458 is coupled to input 502 of multiplier 442. In one embodiment, multiplier 442 converts any zeros on input 502 into a negative one and multiplies the overall position error sign value on input 502 with the position error amplitude value on input 440 to generate a signed position error value on output 504. In an alternative embodiment, multiplier 442 simply appends the position error sign value on input 502 as a sign bit to the position error amplitude value.

The signed position error value generated by demodulator 300 is used by controller 126 (shown in FIG. 1) to control the radial position of head 134 relative to the desired track centerline on the surface of disc 122.

Figure 10:
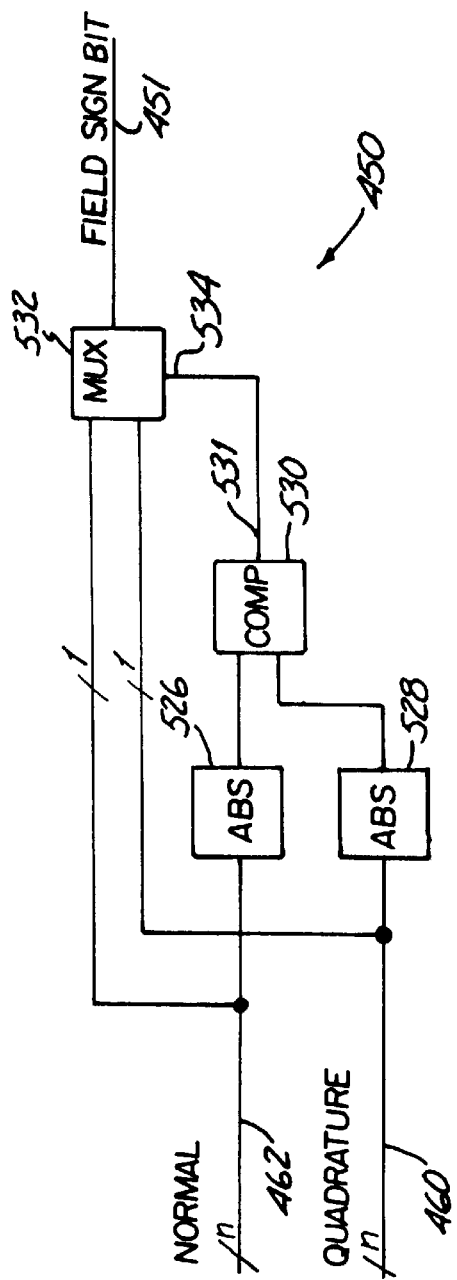
FIG. 10 is a block diagram of a sign detector circuit used in the demodulator circuit shown in FIG. 7 according to one embodiment of the present invention.

FIG. 10 is a block diagram of sign detector circuit 450 according to one embodiment of the present invention. If the normal and quadrature Fourier coefficients are close in magnitude, they are both presumed to be above a noise floor of the measurement and are each valid for use in determining the field sign. In that case, one or the other coefficient can be used consistently to obtain the correct field sign. If the two Fourier coefficients differ from one another, then the larger of the coefficients is chosen for the field sign determination in order to avoid sign detection errors due to the use of a Fourier coefficient that is within the noise floor.

This field sign determination can be implemented with a variety of circuits. For example, in FIG. 10, sign detector circuit 450 includes absolute value circuits 526 and 528, comparator 530 and multiplexer 532. The normal and quadrature coefficients of each field are applied to the inputs of absolute value circuits 526 and 528, respectively. Absolute value circuits 526 and 528 determine the absolute values of these coefficients. The output of absolute value circuit 526 is coupled to one of the inputs of comparator 530. The output of absolute value circuit 528 is coupled to the other input of comparator 530. Output 531 of comparator 530 is coupled to select input 534 of multiplexer 532, which receives the sign bits of the normal and quadrature coefficients at its data inputs. The output of multiplexer 532 is output 451 of sign detector circuit 450.

In operation, comparator 530 compares the absolute values of the normal and quadrature coefficients to one another and generates a multiplexer select signal on output 531, which is indicative of the comparison. For example, comparator 530 generates a logical "0" on output 531 when the normal coefficient is greater than the quadrature coefficient and a logical "1" on output 531 when the quadrature coefficient is greater than or equal to the normal coefficient. When output 531 is a "0", multiplexer applies the normal sign bit to the overall field sign output 451. When output 531 is a "1", multiplexer applies the quadrature sign bit to the overall field sign output 451.

The performance of the embodiment described above has been shown to be better than many existing demodulation techniques. Other commonly-used servo patterns, such as split-burst amplitude patterns and associated demodulation techniques, yield position error qualities that are on the order of 6 dB worse than the use of a null-type pattern with analog synchronous demodulation. However, using a simulation of the circuitry of FIG. 7, the present inventors determined that the present invention yields position error qualities that are only 1.4 dB worse then the use of a null-type pattern with analog synchronous demodulation. Therefore, the use of asynchronous analog demodulation is a gain of around 4.5 dB over split-burst amplitude patterns and demodulation methods.

This makes the asynchronous analog null-type demodulation of the present invention ideal for low cost implementations, where extreme position error quality is not strictly necessary, but where improved position error quality is desired.

Figure 11:
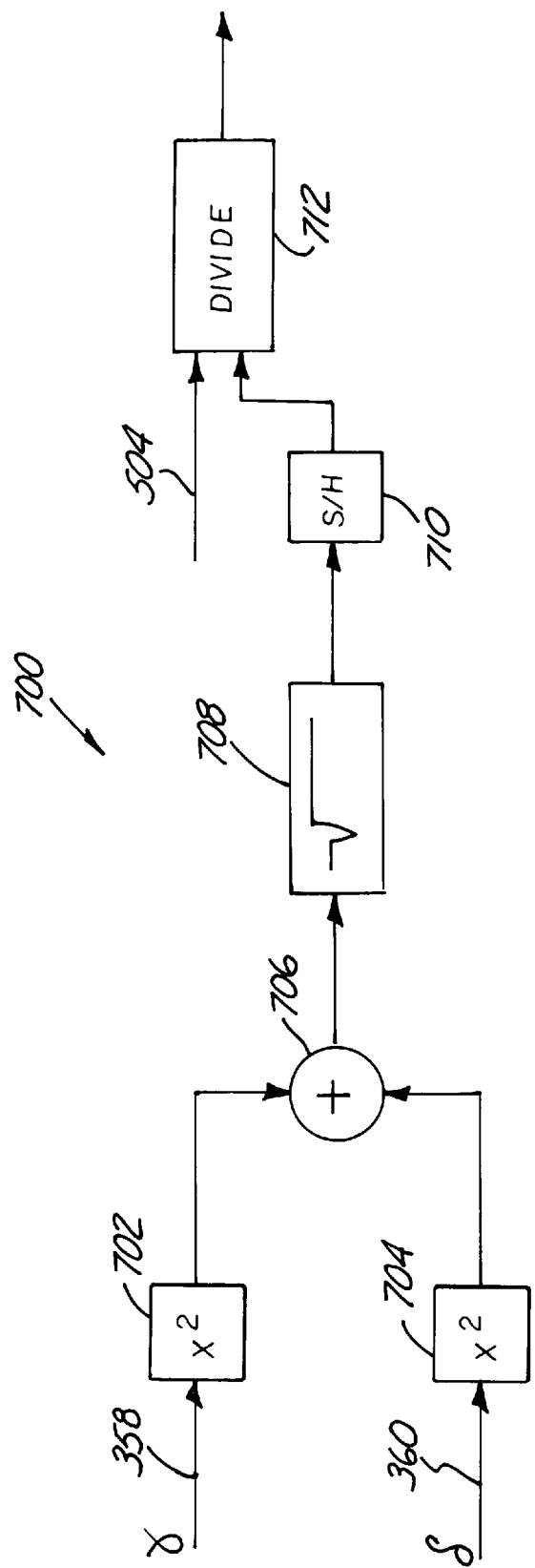
FIG. 11 is a block diagram of a normalization circuit for normalizing the position error magnitude according to an alternative embodiment of the present invention.

In some embodiments, the signed position error value produced by demodulator 300 of FIG. 7 at multiplier output 504 is normalized before being used to control the servo system. FIG. 11 is a block diagram of a circuit 700 for performing this normalization. In normalization circuit 700, the phase field Fourier coefficients γ and δ produced by analog-to-digital converters 357 and 359 of FIG. 7 are provided to squaring circuits 702 and 704, respectively, through connections to analog to digital converters 357 and 359, respectively. Squaring circuits 702 and 704 square each respective coefficient and provide the squares to the inputs of summing circuit 706, which sums the squares. The sum of the squares, $\gamma^2$ and $\delta^2$, is then provided to a square-root circuit 708, which takes the square root of the sum to produce the amplitude of the phase field portion of the readback signal.

This amplitude is stored in sample and hold circuit 710 while the unscaled position error amplitude value is estimated using the techniques discussed above in connection with FIG. 7. When the unscaled position error value appears on output 504 of multiplier 442 of FIG. 7, it is divided by the amplitude of the phase field portion of the readback signal by a division circuit 712, which is connected to the output of sample and hold circuit 710. The output of division circuit 712 is a normalized position error value.

In summary, the present invention provides a disc drive storage device 120 for accessing data on storage medium 122. The disc drive 120 includes a read head 134 for generating a read signal 400. A servo system 126, 142, 150, 152, 162 and 164 positions the read head 134 over the medium 122 based in part on a position error value 504 that represents the distance and direction that the read head 134 is displaced from a location 191 on the medium 122. A normal signal generator 322 generates a normal demodulating signal 414. A quadrature signal generator 320 generates a quadrature demodulating signal 412 that is orthogonal to the normal demodulating signal 414. A normal multiplier 314 multiplies the read signal 400 by the normal demodulating signal 414 to produce a normal position signal on output 352. A quadrature multiplier 312 multiplies the read signal 400 by the quadrature demodulating signal 412 to produce a quadrature position signal on output 350. A magnitude determination circuit 354, 356, 420 and 422 determines a magnitude of the position error value based at least in part on the normal position signal on output 352 and the quadrature position signal on output 350. A sign determination circuit 354, 356, 450, 452, 454, 456, 458, and 460 determines a sign of the position error value based at least in part on the normal position coefficients.

In one embodiment, the magnitude determination circuit includes a normal integrator 356 coupled to the normal multiplier 314 for integrating a portion of the normal position signal to produce a normal position error coefficient α on output 360 and includes quadrature integrator 354 coupled to the quadrature multiplier 213 for integrating a portion of the quadrature position signal to produce a quadrature position error coefficient β on output 358. A squaring circuit 430 and 432 squares the normal position error coefficient a and the quadrature position error coefficient β to produce squared coefficients. A summing circuit 434 sums the squared coefficients to produce a sum of squares. A square root circuit 436 takes the square root of the sum of squares to produce the magnitude of the position error value.

The sign determination circuit includes the normal integrator 356, which is coupled to the normal multiplier 314 for integrating a portion of the normal position signal to produce a normal phase coefficient γ and includes the quadrature integrator 354, which is coupled to the quadrature multiplier 312 for integrating a portion of the quadrature position signal to produce a quadrature phase coefficient δ. The sign determination circuit further includes sign detector circuit 450, 452, 454, 456, 458, and 460, which generates the sign of the position error value based on a comparison of the sign of the normal phase coefficient γ to the sign of the normal position error coefficient α.

Another aspect of the present invention provides a disc drive storage device 120 for accessing data on a medium 122, wherein the device 120 includes a servo structure 126, 142, 150, 152, 162 and 164 for positioning a head 134 over the medium 122 based on a position error for the head 134 relative to the medium 122. The device 120 further includes digital demodulation means 300 for receiving a read signal 400 from the head 134 and generating the position error asynchronously to the read signal 400.

Yet another aspect of the present invention provides a. method for determining a position error of a read head 134 relative to a position on a medium 122 in a storage device 120. The method includes steps of: (a)generating a read signal 400 on input 302 as the read head 134 passes over a servo area 180 on the medium 122; (b)generating a normal demodulating signal 414 on output 326 that is asynchronous with the read signal 400; (c)generating a quadrature demodulating signal 412 on output 324 that is ninety degrees out of phase with the normal demodulating signal 414; (d) multiplying the normal demodulating signal 414 by the read signal 400 to produce a normal position signal on output 352; (e)multiplying the quadrature demodulating signal 412 by the read signal 400 to produce a quadrature position signal on output 350; and (f)producing a position error magnitude on output 428 and a position error direction on output 494 based on the normal and quadrature position signals.

Yet another aspect of the present invention provides a method for determining a position error value having a magnitude and a sign indicative of the distance and direction that a read head 134 is displaced relative to a location on a storage medium 122. The method includes steps of: (a) generating a phase field read signal 402 from a phase field 202 on the medium 122; (b) generating a position error field read signal 404 from a position error field 206 on the medium 122; (c) demodulating the position error field read signal 404 using at least one demodulating signal 412,414 to produce at least one position error field coefficient α and β, the at least one demodulating signal 412, 414 being asynchronous to the position error field read signal 404; (d) demodulating the phase field read signal 402 using at least one demodulating signal 412, 414 to produce at least one phase field coefficient γ and δ; (e) determining the magnitude of the position error value based at least in part on the at least one position error field coefficient α and β; and (f) determining the sign of the position error value based at least in part on the at least one position error field coefficient α and β and the at least one phase field coefficient γ and δ.

It is to be understood that even though numerous characteristics and advantages of various embodiments of the present invention have been set forth in the foregoing description, together with details of the structure and function of various in embodiments of the invention, this disclosure is illustrative only, and changes may be made detail, especially in matters of structure and arrangement of parts within -the- principles of the present invention to the full extent indicated by the broad general meaning of the terms in which the appended claims are expressed. For example, demodulation of the phase and position error fields can be performed sequentially with the same circuitry or can be performed by parallel circuitry depending on the particular application without departing from the scope and spirit of the present invention. Other modifications can also be made.

What is claimed is:

1. A method for determining a position error of a read head relative to a position on a medium in a storage device based on a read signal from a servo area on the medium, the method comprising steps of:
- (a1) generating a read signal comprising a phase field signal produced from a phase field on the medium and a position error field signal produced from a null-type position error field on the medium;
- (a2) generating a normal demodulating signal that is asynchronous with the read signal;
- (b) generating a quadrature demodulating signal that is ninety degrees out of phase with the normal demodulating signal;
- (c) multiplying the normal demodulating signal by the read signal to produce a normal position signal;
- (d) multiplying the quadrature demodulating signal by the read signal to produce a quadrature position signal; and
- (e) producing a position error magnitude and a position error direction based on the normal position signal and the quadrature position signal.

2. The method of claim 1 wherein the multiplying step (c) comprises multiplying the phase field signal by the normal demodulating signal to produce a phase portion of the normal position signal and multiplying the position error field signal by the normal demodulating signal to produce a position error portion of the normal position signal.

3. The method of claim 2 wherein the multiplying step (d) comprises multiplying the phase field signal by the quadrature demodulating signal to produce a phase portion of the quadrature position signal and multiplying the position error field signal by the quadrature demodulating signal to produce a position error portion of the quadrature position signal.

4. The method of claim 3 wherein the producing step (e) comprises:
- (e)(i) integrating the position error portion of the normal position signal to produce a normal position error coefficient;
- (e)(ii) integrating the position error portion of the quadrature position signal to produce a quadrature position error coefficient;
- (e)(iii) squaring the normal position error coefficient and the quadrature position error coefficient to produce squares;
- (e)(iv) summing the squares of the normal position error coefficient and the quadrature position error coefficient to produce a sum; and
- (e)(v) taking the square-root of the sum to produce the position error magnitude.

5. The method of claim 3 wherein the producing step (e) comprises:
- (e)(i) integrating the position error portion of at least one of the normal position signal and the quadrature position signal to produce a position error coefficient;
- (e)(ii) integrating the phase portion of at least one of the normal position signal and the quadrature position signal to produce a phase coefficient; and
- (e)(iii) comparing the sign of the position error coefficient to the sign of the phase coefficient to determine the position error direction.

6. The method of claim 3 wherein the producing step (e) comprises:
- (e)(i) integrating the position error portion of the normal position signal to produce a normal position error coefficient;
- (e)(ii) integrating the position error portion of the quadrature position signal to produce a quadrature position error coefficient;
- (e)(iii) integrating the phase portion of the normal position signal to produce a normal phase coefficient;
- (e)(iv) integrating the phase portion of the quadrature position signal to produce a quadrature phase coefficient;
- (e)(v) comparing the magnitude of the normal position error coefficient to the magnitude of the quadrature position error coefficient to determine which is a larger magnitude position error coefficient;
- (e)(vi) comparing the magnitude of the normal phase coefficient to the magnitude of the quadrature phase coefficient to determine which is a larger magnitude phase coefficient; and
- (e)(vii) determining the position error direction by comparing the sign of the larger magnitude position error coefficient to the larger magnitude phase coefficient.

7. A method for determining a position error value having a magnitude and a sign indicative of the distance and direction that a read head is displaced relative to a location on a storage medium, the method comprising steps of:
- (a) generating a phase field read signal from a phase field on the medium;
- (b) generating a position error field read signal from a position error field of a null-type servo pattern on the medium;
- (b2) generating at least one demodulating signal that is asynchronous to the position error field read signal;
- (c) demodulating the position error field read signal using at least one demodulating signal to produce at least one position error field coefficient;
- (d) demodulating the phase field read signal using at least one demodulating signal to produce at least one phase field coefficient;
- (e) determining the magnitude of the position error value based at least in part on the at least one position error field coefficient; and
- (f) determining the sign of the position error value based at least in part on the at least one position error field coefficient and the at least one phase field coefficient.

8. The method of claim 7 wherein the demodulating step (c) comprises:
- (c)(i) multiplying the position error field read signal by a normal asynchronous demodulating signal to produce a position error portion of a normal position signal; and
- (c)(ii) integrating the position error portion of the normal position signal to produce a normal position error field coefficient.

9. The method of claim 8 wherein the demodulating step (d) comprises:
- (d)(i) multiplying the phase field read signal by a normal asynchronous demodulating signal to produce a phase portion of the normal position signal; and
- (d)(ii) integrating the phase portion of the normal position signal to produce a normal phase field coefficient.

10. The method of claim 9 wherein the demodulating step (c) further comprises:
- (c)(iii) multiplying the position error field read signal by a quadrature asynchronous demodulating signal that is orthogonal to the normal asynchronous demodulating signal to produce a position error portion of a quadrature position signal; and (c)(iv) integrating the position error portion of the quadrature position signal to produce a quadrature position error field coefficient.

11. The method of claim 10 wherein the demodulating step (d) further comprises:

(d)(iii) multiplying the phase field read signal by a quadrature asynchronous demodulating signal that is orthogonal to the normal asynchronous demodulating signal to produce a phase portion of the quadrature position signal; and (d)(iv) integrating the phase portion of the quadrature position signal to produce a quadrature phase field coefficient.

12. The method of claim 11 wherein the determining step (e) comprises:

(e)(i) squaring the normal position error field coefficient to produce a squared normal coefficient;

(e)(ii) squaring the quadrature position error field coefficient to produce a squared quadrature coefficient;

(e)(iii) summing the squared normal coefficient and the squared quadrature coefficient to produce a coefficient sum; and (e)(iv) taking the square root of the coefficient sum to produce the magnitude of the position error value.

13. The method of claim 11 in the determining step (f) comprises comparing the sign of at least one of the normal and quadrature position error field coefficients to the sign of at least one of the normal and quadrature phase field coefficients.

14. The method of claim 11 wherein the determining step (f) comprises:

(f)(i) comparing the magnitude of the normal position error field coefficient to the magnitude of the quadrature position error field coefficient to identify a larger position error field coefficient;

(f)(ii) comparing the magnitude of the normal phase field coefficient to the magnitude of the quadrature phase field coefficient to identify a larger phase field coefficient; and (f)(iii) comparing the sign of the larger position error field coefficient to the sign of the larger phase field coefficient to determine the sign of the position error value.

15. A disc drive storage device for accessing data on a storage medium, the disc drive comprising:

a read head for generating a read signal;

a servo system for positioning the read head over the medium based in part on a position error value that represents the distance and direction that the read head is displaced from a location on the medium;

a normal signal generator for generating a normal demodulating signal;

a quadrature signal generator for generating a quadrature demodulating signal that is orthogonal to the normal demodulating signal;

a normal multiplier for multiplying the read signal by the normal demodulating signal to produce a normal position signal;

a quadrature multiplier for multiplying the read signal by the quadrature demodulating signal to produce a quadrature position signal;

a magnitude determination circuit for determining a magnitude of the position error value based at least in part on the normal position signal and the quadrature position signal; and a sign determination circuit for determining a sign of the position error value based at least in part on the normal position signal, the sign determination circuit comprising:

a normal integrator coupled to the normal multiplier for integrating a portion of the normal position signal to produce a normal phase coefficient;

a quadrature integrator coupled to the quadrature multiplier for integrating a portion of the quadrature position signal to produce a quadrature phase coefficient; and a sign detector circuit which generates the sign of the position error value based on a comparison of the sign of the normal phase coefficient to the sign of the quadrature phase coefficient.

16. The disc drive of claim 15 wherein the magnitude determination circuit comprises:

a normal integrator coupled to the normal multiplier for integrating a portion of the normal position signal to produce a normal position error coefficient;

a quadrature integrator coupled to the quadrature multiplier for integrating a portion of the quadrature position signal to produce a quadrature position error coefficient;

a squaring circuit for squaring the normal position error coefficient and the quadrature position error coefficient to produce squared coefficients;

a summing circuit for summing the squared coefficients to produce a sum of squares; and a square root circuit for taking the square root of the sum of squares to produce the magnitude of the position error value.

17. A disc drive storage device for accessing data on a medium, the disc drive comprising:

a servo structure for positioning a head over the medium based on a position error for the head relative to the medium; and analog demodulation means for receiving a read signal from the head and generating the position error asynchronously to the read signal.

* * * * *